United States Patent
Tan et al.

(10) Patent No.: US 10,595,180 B1
(45) Date of Patent: Mar. 17, 2020

(54) METHOD AND APPARATUS FOR UPDATING SOFTWARE

(71) Applicant: MOTOROLA SOLUTIONS, INC., Chicago, IL (US)

(72) Inventors: Chun Meng Tan, Bayan Lepas (MY); Anoop Sehgal A/L Paras Ram, Ipoh (MY); Tejeash Duraimanickam, Lunas (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/546,408

(22) Filed: Aug. 21, 2019

(51) Int. Cl.
  *H04W 4/10* (2009.01)
  *H04W 76/45* (2018.01)
  *H04W 4/50* (2018.01)
  *G06F 8/65* (2018.01)

(52) U.S. Cl.
  CPC ............. *H04W 4/50* (2018.02); *G06F 8/65* (2013.01); *H04W 4/10* (2013.01)

(58) Field of Classification Search
  CPC .......... H04W 4/06; H04W 4/08; H04W 4/10; H04W 76/45; H04W 84/08; H04L 29/06442; H04L 65/4061
  See application file for complete search history.

(56) References Cited

U.S. PATENT DOCUMENTS

| | | | | |
|---|---|---|---|---|
| 6,204,844 B1* | 3/2001 | Fumarolo | ............. | H04W 8/186 715/736 |
| 7,636,693 B2 | 12/2009 | Faur et al. | | |
| 7,702,347 B1* | 4/2010 | Vu | ............. | H04M 3/46 455/518 |
| 8,214,470 B2 | 7/2012 | Quilty | | |
| 2003/0083086 A1* | 5/2003 | Toyryla | ............. | H04W 4/08 455/518 |
| 2005/0197146 A1* | 9/2005 | Rao | ............. | H04W 8/186 455/519 |
| 2006/0294019 A1 | 12/2006 | Dayan et al. | | |
| 2009/0119655 A1* | 5/2009 | Quilty | ............. | G06F 8/65 717/168 |
| 2014/0233447 A1* | 8/2014 | Ofir | ............. | H04W 4/10 370/312 |
| 2016/0234663 A1* | 8/2016 | Tillet | ............. | H04W 4/10 |
| 2016/0286364 A1* | 9/2016 | Du | ............. | H04W 4/06 |

OTHER PUBLICATIONS

OS Software Upgrade FAQ: "If you can't connect to the App Store, iTunes Store, or Apple Books", https://support.apple.com/en-sg/HT201400, published date: Oct. 1, 2018, downloaded from the internet: Aug. 21, 2019, all pages.

* cited by examiner

*Primary Examiner* — San Htun

(57) ABSTRACT

A method and apparatus for determining a success or failure of a software update is provided herein. When software is updated, part of the update process will require a radio to be configured to communicate on a new "update talkgroup". As part of the update process, the user's device will send a short PTT bursts on the update talkgroup. If the PTT burst on the update talkgroup is received, it is assumed that the update was successful. If, however, the PTT burst on the update talkgroup is not received, it is assumed that the update was unsuccessful, stopping any further updates to other radios.

4 Claims, 7 Drawing Sheets

METHOD AND APPARATUS FOR UPDATING SOFTWARE

RELATED APPLICATIONS

The present invention is related to co-pending U.S. patent application Ser. No. 16/546,435, filed on the same day as the present application.

BACKGROUND OF THE INVENTION

In a public-safety communication system, oftentimes public-safety radios are updated over-the-air. In other words, radios are updated by transmitting updated software to the radio over the air, to have the radio install the updated software in the field. Unfortunately, some times the software update fails. Since the radios being updated are in the field, it is often difficult to realize that a radio has become unusable because of a software update.

Because push-to-talk (PTT) functionality is so ubiquitous in the public-safety realm, it would be beneficial if this functionality could be utilized to determine the success or failure of a software update.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
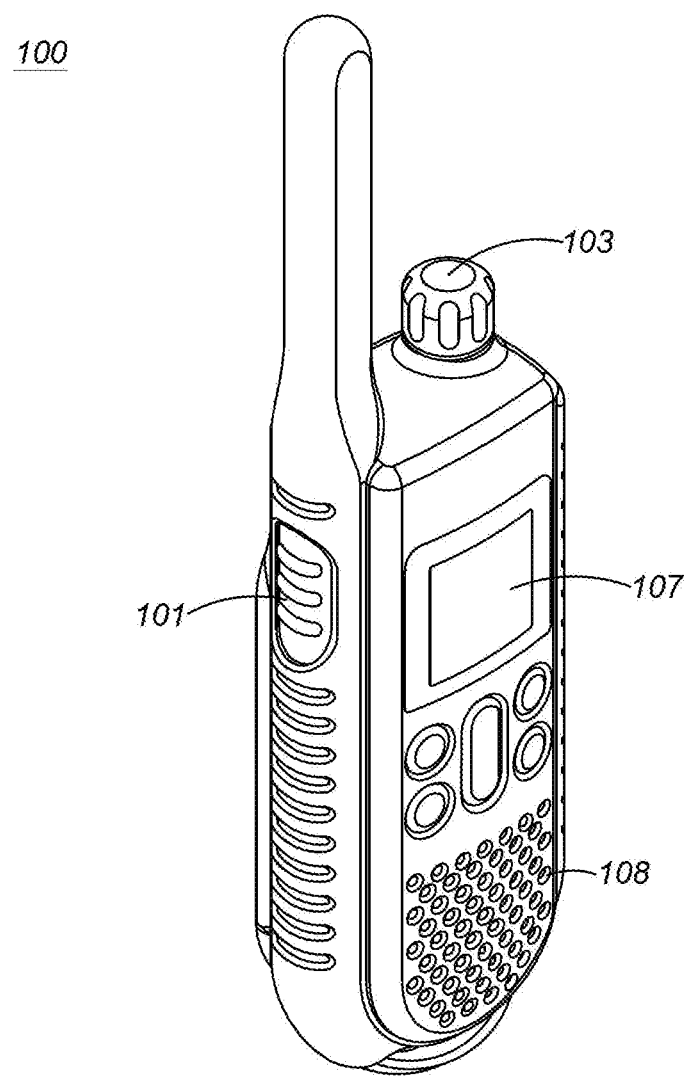
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to use PTT functionality to give an indication on the success or failure of a software update, a method and apparatus for determining a success or failure of a software update is provided herein. When software is updated, part of the update process will require a radio to be configured to communicate on a new "update talkgroup". As part of the update process, the user's device will send a short PTT bursts on the update talkgroup. If the PTT burst on the update talkgroup is received, it is assumed that the update was successful. If, however, the PTT burst on the update talkgroup is not received, it is assumed that the update was unsuccessful, stopping any further updates to other radios.

A server will be provided that provides the updated software to the radio. The server will also determine whether or not the update was successful. In other words, the server will determine if a particular radio being updated does, or does not transmit on the update talkgroup as part of the update process. If it is determined that a particular updated radio does not transmit on the update talkgroup as part of the update process, all further updates to other radios are halted.

It should be noted that this specification describes updating "software", which can be thought of as updating software that runs on a radio. Such software includes, but is not limited to applications such as web browsers, e-mail programs, word processors, games, utilities, . . . , etc. However, the present invention is also applicable to upgrading system software which consists of programs that run in the background, enabling applications to run. Therefore, the term "software" used herein is meant to include any form of applications, software, firmware, system software, . . . , etc. that can be executed and updated on a radio.

As known in the art, PTT devices are commonly employed by public safety personnel, air traffic controllers, emergency workers, construction site workers, scientists, and others who need to be in constant and readily available voice communication. PTT, also known as press-to-transmit, is a method of communicating using half-duplex communication lines. A PTT button may be pressed to switch a device from a voice reception mode to a transmit-mode. For example, when a channel/talkgroup is selected, one operator may depress the PTT button on his/her device and speak into the device's microphone. The speech is converted into an appropriate format and transmitted to one or more other devices over the channel/talkgroup, where the operators of those other devices hear the first operator speak through their device's speaker.

When communicating over a talkgroup/channel, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup. In addition of communication over a single talkgroup on a single wireless communication over an air interface, it can also communicate over multiple talkgroups over multiple wireless communication over the air interface which is also known as converge platforms such as LMR and WiFi, LMR and LTE, etc.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel.

Many unrelated conversations can occur on a channel, making use of the otherwise idle time between conversations. A control channel coordinates all the activity of the radios in the system. The control channel sends packets of data to enable one talkgroup to talk together, regardless of frequency.

Considering the above, when the software is updated, part of the update process will cause the radio to transmit on a specific update talkgroup as a final test of whether or not the software has been successfully updated. In one embodiment of the present invention, a radio is not configured to communicate over the update talkgroup prior to the update process beginning. As part of the update process, the radio will be programmed with the update talk group by sending a regroup command to the radio. This is accomplished automatically, as part of the update process. The regroup command configures the radio to utilize the update talkgroup. At the end of the software-update procedure, the radio is instructed to transmit over the update talkgroup. After communication on the update talkgroup takes place, the radio is then sent another regroup command, removing the update talkgroup from the radio (preventing further communication on the update talkgroup).

It should be noted that no radio will be configured with the update talkgroup unless an update of that radio is occurring. Because of this, communication over the update talkgroup will not be heard by other radios.

In this particular embodiment, the selector knob on the radio is used for both selecting an application and selecting a channel or a talkgroup (as discussed, a talkgroup is an assigned group of radios on a trunked radio system). When either an application or talkgroup is "selected", the application or talkgroup name will be displayed "highlighted". Highlighting an application or talkgroup name may comprise displaying the font in bold, italics, in a particular color, surrounded by an outline (e.g., a box), or any other form of displaying the application or talkgroup name in a different manner than the non-highlighted applications or talkgroups.

In addition, if the PTT button is pressed while an application is selected, the voice will be routed to the application as described in U.S. patent application Ser. No. 16/248,938, entitled "Push to Talk to Applications", incorporated by reference herein. Thus, the PTT button on the radio is used for both selecting a voice input for an application and transmitting the voice-input over the air on the channel or talkgroup. The decision on whether or not to use the voice as an input to an application, or to send the voice over-the-air depends on whether or not a channel/talkgroup is selected, or an application is selected using the selector knob.

In a particular embodiment of the present invention, all radios will be configured to not display the update talkgroup during the update process. Thus, the transmission of radio 100 over the update talkgroup will be unknown to the user of radio 100. Because of this, users of a radio will not be confused seeing a particular talkgroup displayed which they are not used to seeing.

FIG. 1 illustrates push-to-talk (PTT) radio 100. As shown, radio 100 comprises PTT button 101, knob 103, display/screen 107, and speaker/microphone 108. PTT button 101 comprises a standard button that may be mechanical or virtual (touchscreen user interface button). When a talkgroup or channel is selected via knob 103 and PTT button 101 is pressed, radio 100 transitions from a listening state, to a transmit state, transmitting received voice over the selected talkgroup (herein the term "talkgroup" will be meant to comprise both a talkgroup and/or a physical channel). When an application is selected via knob 103 and PTT button 101 is pressed, radio 100 transitions from a listening state to a "voice collecting" state and inputs the collected voice into the selected application. The voice may be converted to text prior to being input into the selected application. If the application has no use for voice input, then the voice collected will simply be discarded, or alternatively, no voice will be collected.

Display 107 comprises a way of conveying (e.g., displaying) a list of applications and talkgroups as well as the knob-selection information to the user. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Microphone 108 comprises a standard microphone 108 for converting sound waves to electrical signals for text-to-speech conversion, transmission over a talkgroup, recording, and/or input into an application.

Knob 103 includes an internal sensor (not shown) as known in the art to provide position and direction information to logic circuitry to communicate knob position for selection of menu items. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc. Knob 103 is configured such that rotation of knob 103 serves to "walk" down a list of applications and talkgroups, switching between talkgroups and applications as the knob rotates. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

A user preferably grips or contacts the circumferential surface of knob 103 and rotates it a desired amount to scroll through menu items (the menu items comprise listed talkgroups and applications). A selected menu item is highlighted. Once knob 103 is rotated to highlight a particular talkgroup/application, any activation (pushing) of the PTT button 101 will cause radio 100 to function as described above.

Figure 2:
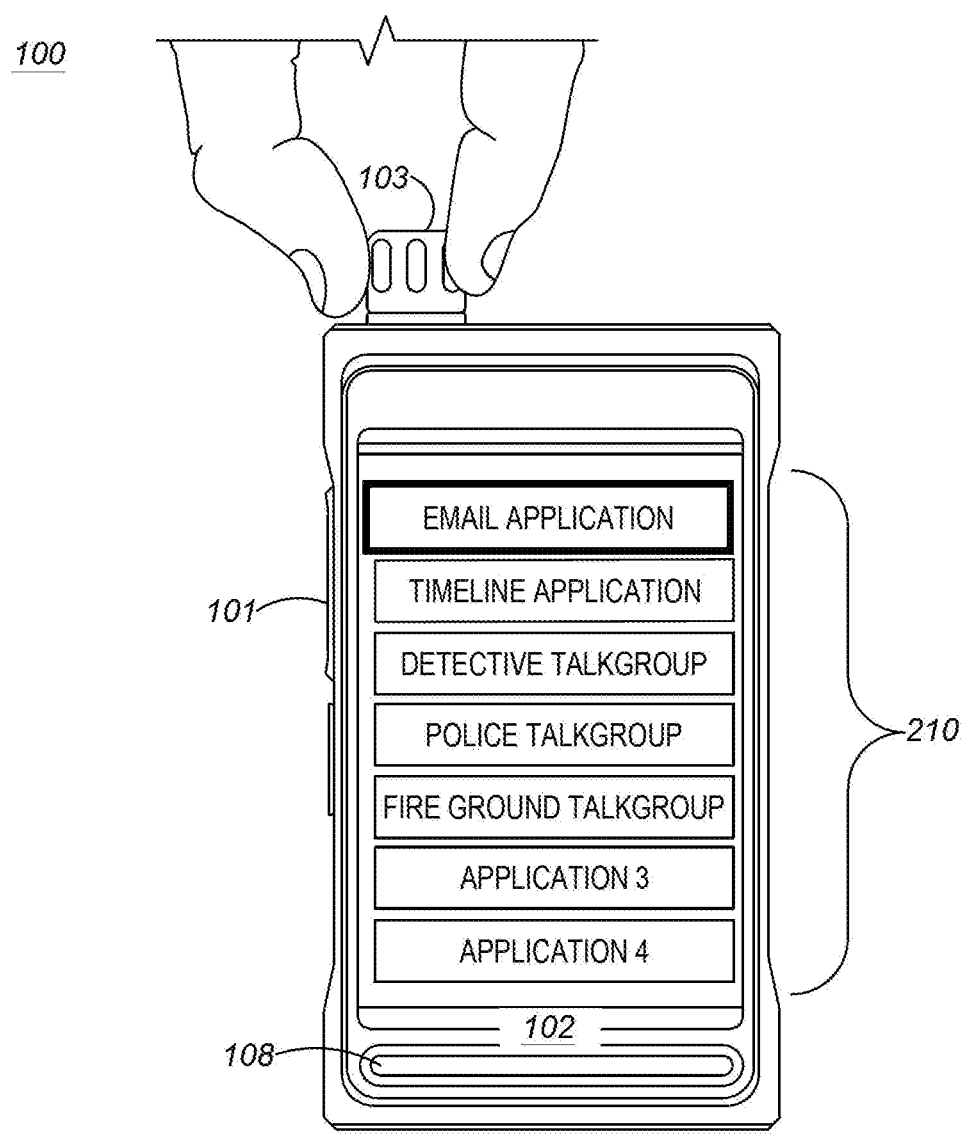
FIG. 2 illustrates PTT radio with a menu of talkgroups and applications.

It should be noted that display 102 will preferably display both the names of the talkgroups and particular applications in a list. For example, as shown in FIG. 2, the Police Talkgroup, Detective Talkgroup, and the Fire Ground talkgroup may be displayed in a list 210, so when one of the talkgroups is highlighted, communications to other police officers, or firemen take place over the talkgroup upon the pushing of the PTT button 101. However, as also shown, applications may also be displayed in list 210, such as an email application, a timeline application, application 3, application 4, . . . , etc. Other examples of applications are Whatsapp™ application (text messaging application), photo gallery application, calculator application, maps navigation application, calendar application, status update application, job ticket update application, task checklist application, camera application, citation application etc. When an application is highlighted/selected, activation of the PTT button will cause the received voice to be input into the highlighted application.

In FIG. 2, the highlighted and selected item (surrounded with a box) from list 210 comprises the email application. Thus in this example where email application is selected, when user press the PTT button and speak, email application will be launched automatically, and the user's voice will be transcripted to text and inserted into the email composer and then sent out to a predetermined email address. Thus the application name can be preconfigured to be associated with specific email address. The application name can also be more specifically shown with detail configuration (for example, "Email—Patrolling Team", "Email—Manager", "Email—Smith").

As is evident, an update talkgroup is not displayed on list 210. More particularly, prior to upgrading software, radio 100 is not assigned to the update talkgroup. It is only during the upgrading of software on radio 100, that radio 100 will be assigned the update talkgroup. Even when assigned the update talkgroup, radio 100 will be configured to not display the update talkgroup on list 210, since the user of radio 100 has no purpose using the update talkgroup.

Figure 3:
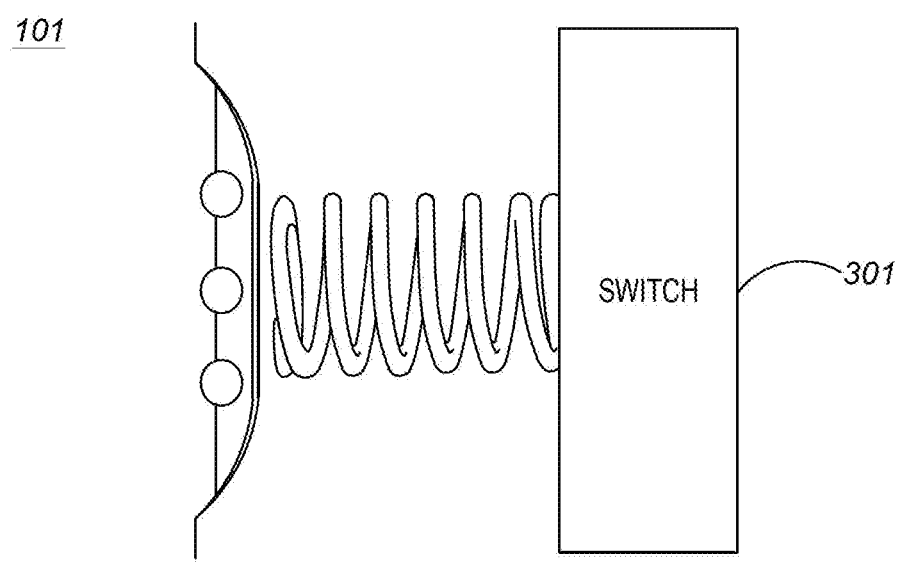
FIG. 3 illustrates a PTT button.

FIG. 3 is a cutaway view of PTT button 101. In this particular example, PTT button 101 also comprises a spring-actuated switch so that the physical depressing (pressing) of button 101 causes radio 100 to activate a half-duplex transmitter or collect voice for input into an application. During operation, switch 301 provides a PTT signal to logic circuitry in order to indicate that the PTT button has been pressed.

Figure 4:
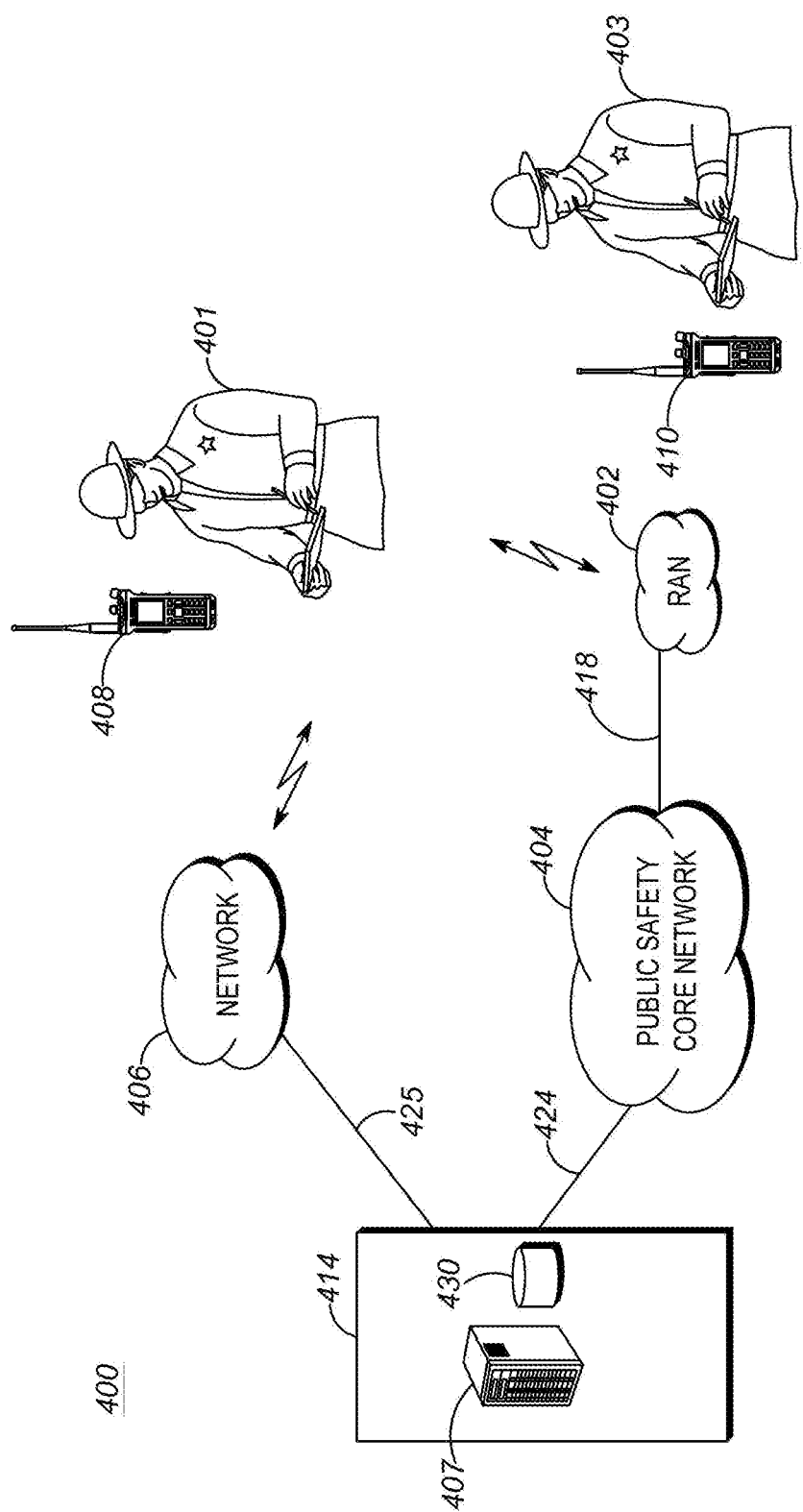
FIG. 4 depicts PTT radio that incorporates a PTT-to-Application function.

FIG. 4 illustrates a general operating environment for the present invention. Environment 400 includes one or more radio access networks (RANs) 402, a public-safety core network 404, devices 408-410, dispatch center 414, and communication links 425, 418, 424. In a preferred embodiment of the present invention, dispatch center 414 serves as a public-safety dispatch center 414. Update server 407 updates software running on devices 408-410. It should be noted that the term "server" and "logic circuitry" can be used interchangeably, and simply mean circuitry that updates software on devices 408-410 as described herein.

Update server 407 is coupled to database 430. Database 430 comprises software that is to be pushed to radios 408 and 410 as part of an update process. It should be noted that although only one update server 407 is shown coupled to database 430, there may exist many servers 407 providing update services to devices 408-410, with each update server 407 sharing database 430 (or a copy of database 430).

Communication between update server 407 and devices 408-410 takes place through an intervening network such as, but not limited to a high-speed data network 406 such as a cellular communication system and/or public-safety core network 404 and RAN 402. Thus, as shown in FIG. 4, two separate networks exist, namely public-safety core network 404 for primarily carrying voice traffic from police radios, and a high-speed network 406 (e.g., Verizon, Spring, AT&T, . . . , etc.) for carrying high-speed data. Each of these networks may be utilized for transmitting requests to access software and ACKs/NACKs.

Each RAN 402 includes typical RAN elements such as base stations, base station controllers (BSCs), routers, switches, and the like, arranged, connected, and programmed to provide wireless service to user equipment (e.g., devices 408-410) operated by officers 401-403) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoW) application may be implemented.

In a similar manner, network 406 includes elements such as base stations, base station controllers (BSCs), routers, switches, and the like, arranged, connected, and programmed to provide wireless service and data to user equipment (e.g., devices 408-410 operated by officers 401-403 in a manner known to those of skill in the relevant art.

Devices 408-410 may be any suitable computing and/or communication devices configured to engage in wireless communication over an air interface as is known to those in the relevant art. Devices 408-410 comprises any device capable of running and updating software. For example, officer devices 412 may comprise a mobile device running an Android™ or iOS™ operating system and having a GPS receiver capable of determining a location.

Mobile devices 408-410 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoW), an LTE Direct or LTE Device to Device, or a PTT over IP (PoW) application may be implemented. Direct mode LTE standards may additionally or alternatively be implemented as well, including but not limited to the LTE Direct device-to-device standard.

It should be noted that while only two officers 401-403 and two devices 408-410 are shown in FIG. 4, one of ordinary skill in the art will recognize that hundreds of officers and devices may actually exist in environment 400.

During operation, devices 408-410 may store software for use by officers 401-403. Some of the software may need to be updated. With this in mind, when software needs to be updated, server 407 will dynamically regroup the radio and add an ability to transmit on a specific update talkgroup. The update talkgroup is specifically dedicated for determining if an update was successful or not no other transmission takes place over the update talkgroup by any radio, except transmissions to aide in determining if an update was successful or not. As part of the update, the radio will transmit on the update talkgroup, and the update talkgroup will be removed from the device after communication on the update talkgroup. If communications are heard on the update talkgroup, it will be assumed that the update was successful.

As discussed radios will be configured to communicate on the update talkgroup by dynamically regrouping the radio as known in the art. With the dynamic regrouping feature, server 407 may configure a radio so that the radio can seamlessly communicate via the update talkgroup. Thus, server 407 is capable of remotely redirecting individual radios to a particular talk group, without any intervention from radio operators.

Since, a single talkgroup may be used for updating software on all radios, an identification of the radio should be included when transmitting on the update talkgroup. More particularly, when a radio transmits on the update talkgroup as part of the software update process, the radio will include an identification so that server 407 may determine what radio was or was not successfully updated.

Figure 5:
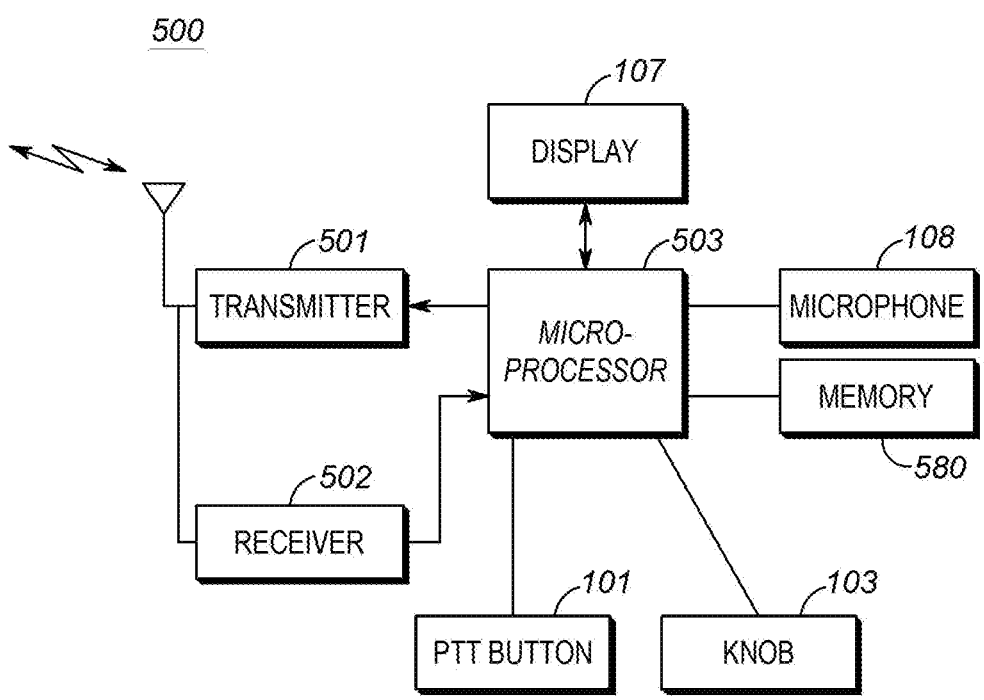
FIG. 5 is a block diagram of a radio/device of FIG. 4.

FIG. 5 is a block diagram of the radios shown in FIG. 1, FIG. 2, and FIG. 4. As shown, radio 500 may include transmitter 501, receiver 502, display 107, logic circuitry (processor) 503, memory 580, knob 103, microphone 108, and PTT button 101. In other implementations, radio 500 may include more, fewer, or different components.

Transmitter 501 and receiver 502 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 501 and receiver 502 may also contain multiple transmitters and receivers, to support multiple communications protocols simultaneously.

Logic circuitry 503 comprises a digital signal processor (DSP), general purpose microprocessor, a programmable logic device, an Application Processor, or application specific integrated circuit (ASIC) and is utilized to execute software, update software, control information displayed on display 107, and route any voice input accordingly.

As discussed above, display 107 is configured to display both applications and talkgroups in a list 210, with only one application or talkgroup highlighted at a time. As discussed above, the update talkgroup is never displayed to the user in list 210.

During operation, logic circuitry 503 receives an over-the-air request to update software from receiver 502 (transmitted from server 407). The request will instruct logic circuitry 503 to dynamically reconfigure the radio to communicate using the update talkgroup, update particular software with newer software that is provided as part of the request, transmit over the update talkgroup, and remove the update talkgroup from the radio.

As is evident, the apparatus in FIG. 5 comprises a radio comprising memory 580 configured to store software, an over-the-air transmitter 501 configured to transmit voice and data over a talkgroup, and an over-the-air receiver 502 configured to receive instructions to update software stored in the memory. Radio 500 also comprises logic circuitry 503 configured to receive instructions to update software, regroup the radio to communicate over an update talkgroup, update the software, instruct the over-the-air transmitter to transmit over the update talkgroup, and regroup the radio to remove the update talkgroup from the radio.

As is evident, "updating" the software comprises the step of replacing the software with another version of the software. Additionally, as discussed, the update talkgroup is only used to transmit information during a software update.

Display 107 is provided displaying a plurality of talkgroups other than the update talkgroup.

Figure 6:
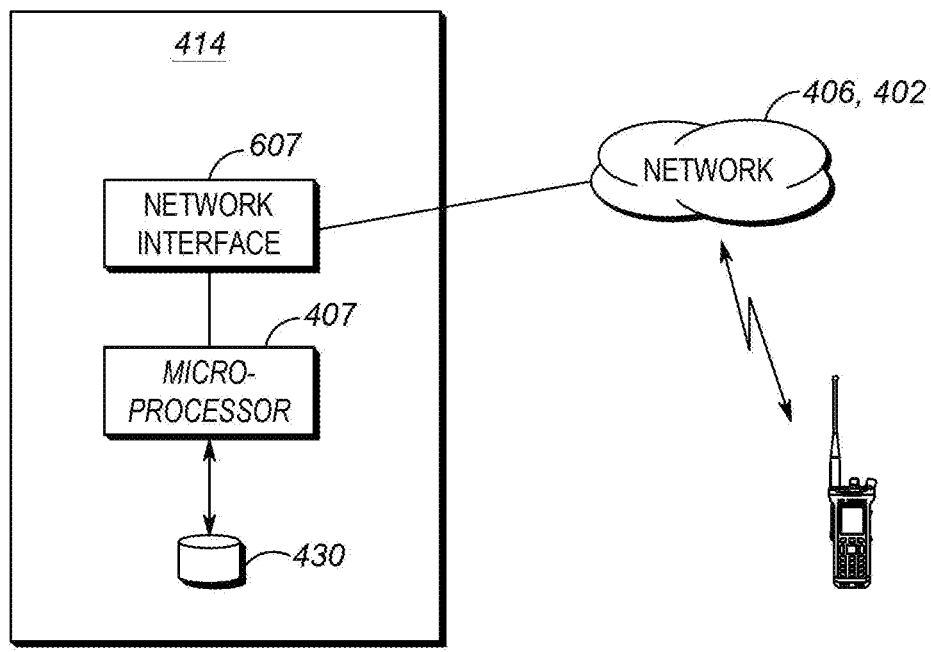
FIG. 6 is a block diagram of a dispatch center of FIG. 4

FIG. 6 is a block diagram of the dispatch center of FIG. 4. In this particular embodiment, server 407 is located within a dispatch center, however, one of ordinary skill in the art will recognize that server 407 may be located in any entity, so long as communication to radios is provided to server 407. As shown, dispatch center 414 may include network interface 607, which may be wired or wireless. If wireless, network interface 607 comprises at least an over-the-air transmitter and a receiver. Dispatch center 414 also includes logic circuitry 407 and databases 430. In other implementations, dispatch center 414 may include more, fewer, or different components.

Logic circuitry 407 serves as update server 407 and comprises a digital signal processor (DSP), general purpose microprocessor, a programmable logic device, or application specific integrated circuit (ASIC) and is utilized to update software on radios, regroup radios, and determine if the software has been updated successfully as described above. Databases 430 comprise standard random-access memory.

In an illustrative embodiment, networks 406 and 402 are attached (i.e., connected) to dispatch center 414 through network interface 607 and communicates with processor 407. Network interface 607 includes elements including processing, modulating, and transceiver elements that are operable in accordance with any one or more standard or proprietary wired or wireless interfaces, wherein some of the functionality of the processing, modulating, and transceiver elements may be performed by means of processor 407.

As described, dispatch center comprises an apparatus comprising memory 430 configured to store software that is to be transmitted to a radio as part of a software update process, network interface 607 configured to transmit and receive voice and data over a talkgroup, logic circuitry 407 configured to send an instruction to update software, send a regroup command to a radio to configure the radio to transmit over an update talkgroup, send updated software to the radio as part of a software update, receive a transmission from the radio over the update talkgroup, and send a second regroup command to the radio to remove the update talkgroup from the radio. As discussed, reception of the transmission from the radio indicates a successful software update, and failure to receive a transmission from the radio indicates a software update failure.

As discussed, the update talkgroup is only used to receive information from the radio during a software update. Additionally, logic circuitry 407 is also configured to stop updating software to other radios upon failure to receive the transmission from the radio. In other words, logic circuitry 407 updates a first radio, listens for communication from the first radio over the update talkgroup, and then updates a second radio, only if transmission was heard over the update talkgroup from the first radio.

Figure 7:
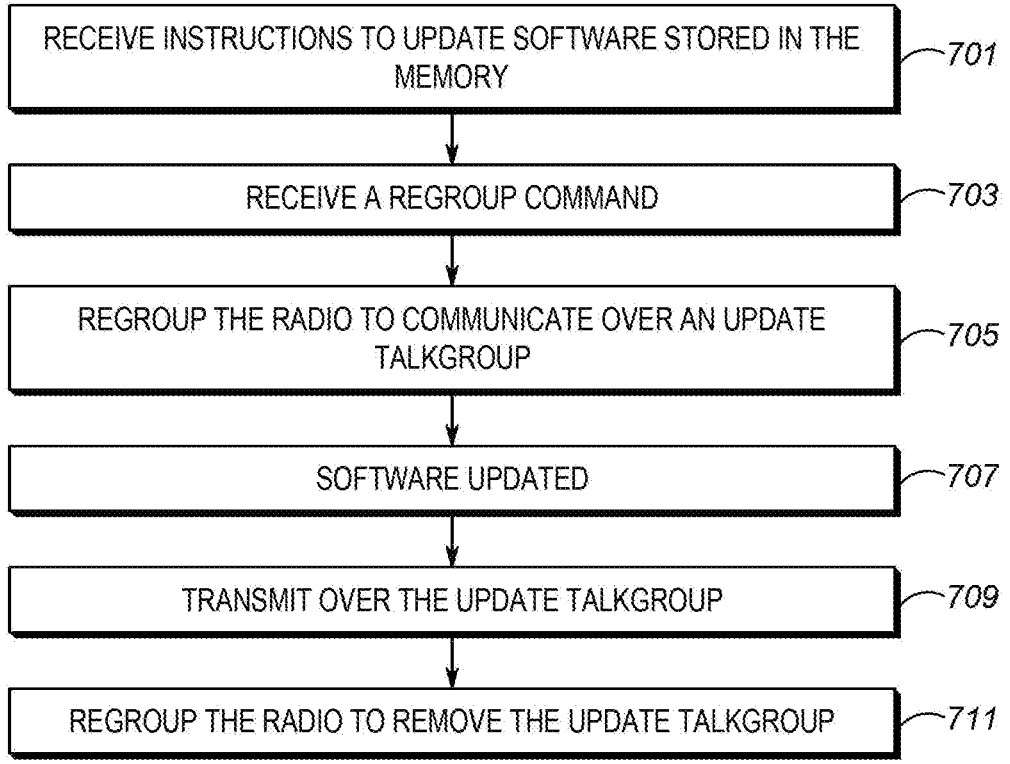
FIG. 7 is a flow chart showing operation of the radio of FIG. 4.

FIG. 7 is a flowchart showing operation of a radio. The logic flow begins at step 701 where over-the-air receiver 502 receives instructions to update software stored in the memory 580 and passes the instructions to logic circuitry 503. At step 703, receiver 503 receives a regroup command and passes the command to logic circuitry 503 which regroups the radio to communicate over an update talkgroup (step 705). Software is then updated by logic circuitry 503 (step 707) and logic circuitry 503 instructs over-the-air transmitter 501 to transmit over the update talkgroup (step 709). Finally, at step 711, logic circuitry 503 regroups the radio to remove the update talkgroup from the radio.

Figure 8:
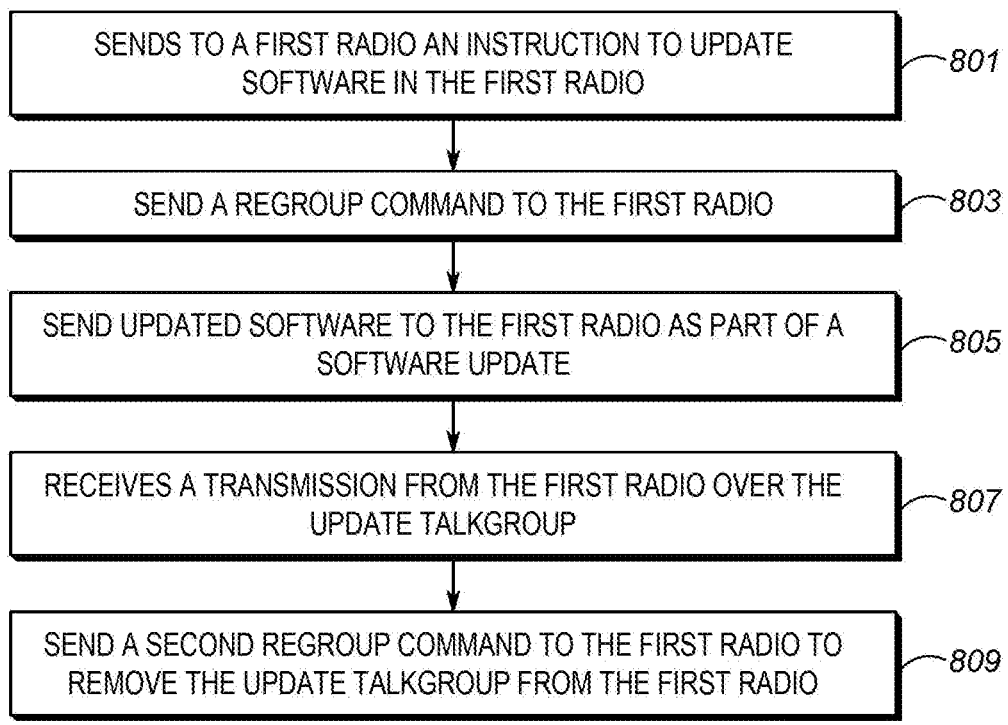
FIG. 8 is a flow chart showing operation of the dispatch center of FIG. 4.

FIG. 8 is a flowchart showing operation of the dispatch center 414. The logic flow begins at step 801 where logic circuitry 407 instructs network interface 607 to send a first radio an instruction to update software in the first radio. At step 803, logic circuitry 407 instructs network interface 607 to send a regroup command to the first radio to configure the first radio to transmit over an update talkgroup. At step 805, logic circuitry 407 instructs network interface 607 to send updated software to the first radio as part of a software update. At step 807, network interface 607 receives a transmission from the first radio over the update talkgroup and passes the transmission to logic circuitry 407. Finally, at step 809, logic circuitry 407 instructs network interface 607 send a second regroup command to the first radio to remove the update talkgroup from the first radio. As discussed above, the reception of the transmission from the radio over the update talkgroup indicates a successful software update, and failure to receive a transmission over the update talkgroup from the radio indicates a software update failure.

Expanding on the above, when transmission over the update talkgroup is received by the first radio, a second radio can then be updated by sending to a second radio an instruction to update software in the second radio, sending a regroup command to the second radio to configure the second radio to transmit over an update talkgroup, sending updated software to the second radio as part of a software update. If for some reason network interface 607 fails to receive a transmission from the second radio over the update talkgroup, the software update procedure is stopped for other radios.

In the foregoing specification, specific embodiments have been described. However, one of ordinary skill in the art appreciates that various modifications and changes can be made without departing from the scope of the invention as set forth in the claims below. For example, although the above description was given having application names displayed with various other talkgroups, in an alternate embodiment, the names of the applications need not be displayed as shown in FIG. 2. In fact, the names of the applications need not be displayed at all. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A radio comprising:
   memory configured to store software;
   an over-the-air transmitter configured to transmit voice and data over a talkgroup;
   an over-the-air receiver configured to receive instructions to update software stored in the memory;
   a display, displaying a list of talkgroups;
   a knob configured such that the rotation of the knob serves to "walk" down the list of talkgroups, wherein the list of talkgroups does not contain the update talkgroup;
   logic circuitry configured to update software on the radio by:
      receive instructions to update software;
      configuring the radio to communicate over an update talkgroup upon the reception of a regroup command;
      updating the software;
      instructing the over-the-air transmitter to transmit over the update talkgroup an indication that the update to the software was successful;
      configuring the display to display the list of talkgroups without displaying the update talkgroup with the list of talkgroups; and
      configuring the radio to remove the update talkgroup from the radio upon the reception of a regroup command.

2. The radio of claim 1, wherein the update talkgroup is only used to transmit information during a software update.

3. The radio of claim 2 further comprising:
   a display, displaying a plurality of talkgroups other than the update talkgroup.

4. A method comprising the steps of:
   receiving instructions to update software stored in the memory;
   displaying a list of talkgroups;
   receiving instructions to update software;
   receiving a regroup command to configure the radio to communicate over an update talkgroup;
   updating the software;
   instructing the over-the-air transmitter to transmit over the update talkgroup an indication that the update was successful;
   walking down the list of talkgroups upon a knob rotation while preventing the update talkgroup from being displayed within the list of talkgroups; and
   receiving a regroup command to configure the radio to remove the update talkgroup from the radio.

* * * * *